US010716108B2

United States Patent
Gao et al.

(10) Patent No.: US 10,716,108 B2
(45) Date of Patent: Jul. 14, 2020

(54) CELLULAR NETWORK ACCESS METHOD AND APPARATUS

(71) Applicants: Samsung Electronics Co., Ltd., Suwon-si (KR); TSINGHUA UNIVERSITY, Beijing (CN)

(72) Inventors: Feifei Gao, Beijing (CN); Jingxing Fu, Beijing (CN); Yingyang Li, Beijing (CN); Chengjun Sun, Beijing (CN)

(73) Assignees: Samsung Electronics Co., Ltd., Suwon-si (KR); Tsinghua University, Beijing (CN)

(*) Notice: Subject to any disclaimer, the term of this patent is extended or adjusted under 35 U.S.C. 154(b) by 89 days.

(21) Appl. No.: 15/525,283

(22) PCT Filed: Nov. 6, 2015

(86) PCT No.: PCT/KR2015/011891
§ 371 (c)(1),
(2) Date: May 8, 2017

(87) PCT Pub. No.: WO2016/072782
PCT Pub. Date: May 12, 2016

(65) Prior Publication Data
US 2017/0325229 A1 Nov. 9, 2017

(30) Foreign Application Priority Data
Nov. 7, 2014 (CN) .......................... 2014 1 0641721

(51) Int. Cl.
*H04W 72/04* (2009.01)
*H04W 76/14* (2018.01)
(Continued)

(52) U.S. Cl.
CPC ....... *H04W 72/0453* (2013.01); *H04W 16/14* (2013.01); *H04W 48/18* (2013.01);
(Continued)

(58) Field of Classification Search
None
See application file for complete search history.

(56) References Cited

U.S. PATENT DOCUMENTS

| 2012/0250636 A1 | 10/2012 | Wang et al. |
| 2013/0223398 A1 | 8/2013 | Li et al. |

(Continued)

FOREIGN PATENT DOCUMENTS

| CN | 102461297 A | 5/2012 |
| CN | 103024911 A | 4/2013 |

(Continued)

OTHER PUBLICATIONS

European Patent Office, "Supplementary European Search Report," European Application No. 15856402.1, dated Oct. 20, 2017, 8 pages.

(Continued)

*Primary Examiner* — Chi H Pham
*Assistant Examiner* — Raul Rivas (57) ABSTRACT

The present application discloses a cellular network access method and apparatus. An embodiment of the cellular network access method for a base station comprises: receiving, from a pair of D2D devices, a result of a spectrum detection which indicates a load level of a detected spectrum; selecting a cellular communication mode or a D2D communication mode based on the received result of the spectrum detection; and notifying the pair of D2D devices of the selected mode. Through dynamic switching between the cellular communication mode and the D2D communication mode, it is possible to make full use of the available spectrum, thereby increasing the throughput of the system.

17 Claims, 6 Drawing Sheets

(51) Int. Cl.
*H04W 76/23* (2018.01)
*H04W 16/14* (2009.01)
*H04W 48/18* (2009.01)
*H04W 72/10* (2009.01)

(52) U.S. Cl.
CPC ....... *H04W 72/0486* (2013.01); *H04W 72/10* (2013.01); *H04W 76/14* (2018.02); *H04W 76/23* (2018.02)

(56) References Cited

U.S. PATENT DOCUMENTS

| | | |
|---|---|---|
| 2013/0250798 A1 | 9/2013 | Iwamura et al. |
| 2013/0272262 A1 | 10/2013 | Li et al. |
| 2013/0322388 A1 | 12/2013 | Ahn et al. |
| 2014/0098759 A1 | 4/2014 | Noh et al. |
| 2014/0342747 A1 | 11/2014 | Lee et al. |
| 2016/0057794 A1* | 2/2016 | Morita ................. H04W 76/14 370/329 |

FOREIGN PATENT DOCUMENTS

| | | |
|---|---|---|
| CN | 103458423 A | 12/2013 |
| JP | 2010035068 A | 2/2010 |
| KR | 20140042723 A | 4/2014 |
| WO | 9806228 A2 | 2/1998 |
| WO | 2013109100 A1 | 7/2013 |
| WO | 2014076551 A1 | 5/2014 |
| WO | 2014157398 A1 | 10/2014 |

OTHER PUBLICATIONS

European Patent Office, "Communication pursuant to Article 94(3) EPC," Application No. EP 15856402.1, dated Apr. 25, 2019, 4 pages.

Foreign Communication From a Related Counterpart Application, PCT Application No. PCT/KR2015/011891, International Search Report dated Apr. 22, 2017, 4 pages.

Foreign Communication From a Related Counterpart Application, PCT Application No. PCT/KR2015/011891, International Search Report dated Apr. 22, 2017, 8 pages.

\* cited by examiner

CELLULAR NETWORK ACCESS METHOD AND APPARATUS

CROSS-REFERENCE TO RELATED APPLICATION(S)

The present application claims priority under 35 U.S.C. § 365 to International Patent Application No. PCT/KR2015/011891 filed Nov. 6, 2015, entitled "CELLULAR NETWORK ACCESS METHOD AND APPARATUS", and, through International Patent Application No. PCT/KR2015/011891, and 35 U.S.C. § 119 to Chinese Patent Application No. 201410641721.0 filed Nov. 7, 2014, each of which are incorporated herein by reference into the present disclosure as if fully set forth herein.

TECHNICAL FIELD

The present application generally relates to a technical field of wireless communication, and particularly to a technical field of cellular network access, and more particularly to methods, apparatuses, base stations and communication devices for accessing to the cellular network.

BACKGROUND ART

With continuous developments of the wireless cellular mobile communicating system, numbers of mobile device users increase gradually. The rapid development brings opportunities as well as pressure and challenges. A novel communicating technology is required to address many problems such as limited spectrum resources, explosive traffic, excessive load of base station, insufficient coverage and the like. The Long Term Evolution (LTE) system of the 3rd Generation Partnership Project (3GPP) improves structures of the network and proposes a heterogeneous network technology, and further proposes many practical technical solutions.

Direct-connect communications or Device-to-device (D2D) communications are well-known and widely used in various prior wireless technologies, for example an ad hoc multiple-hop self-organizing network. Recently, a cell-controlled D2D communication mode is proposed in the LTE/LTE-Advanced (LTE-A) of 3GPP and is a supplement to the existing cellular network communication. In certain conditions, the D2D communication mode can help base stations to share the communication pressure, divert the communication traffic, ensure the communication quality and enlarge the coverage of the communication, and also can be considered as a kind of heterogeneous network.

In accordance with the spectrum sharing scheme, the D2D communication may be classified into two categories, i.e. an in-band D2D using the spectrum of the cellular network and an out-of-band D2D developing and utilizing the unlicensed spectrum. For the in-band D2D, a key question is to control interferences between D2D users and cellular subscribers. For the out-of-band D2D, a key question is to ensure high quality can be obtained at the unlicensed frequency band. To further classify the in-band D2D, one in-band D2D mode is referred to as an overlay mode, if orthogonal cellular spectrums are used in the D2D link and the cellular link; otherwise, one in-band D2D mode is referred to as an underlay mode, if the D2D link may access the same spectrum as that used in the cellular link. The advantage of the overlay mode resides in that there is no interference between the D2D communication and the cellular communication, so that both of the D2D communication and the cellular communication can obtain high link quality. However, the network has to determine the frequency resources that may be allocated to the D2D communication, possibly reducing the utilization efficiency of the spectrum. In contrast, in the underlay mode, the throughput of the network will be elevated, but complicated interference control mechanisms are required to ensure the service quality.

DISCLOSURE OF INVENTION

Technical Problem

An aspect of the present disclosure to provide an antenna array with higher performance than a linier array

Solution to Problem

Considering that the classification of the in-band D2D is very similar to the classification definition of the cognitive radio network, the present application proposes a spectrum sensing based cellular network access scheme for a D2D device.

In a first aspect, a cellular network access method for a base station is provided. The method comprising: receiving, from a pair of D2D devices, a result of a spectrum detection which indicates a load level of a detected spectrum; selecting a cellular communication mode or a D2D communication mode based on the received result; and notifying the pair of D2D devices of the selected mode.

In some embodiments, the step of notifying the pair of D2D devices of the selected mode comprises: assigning a spectrum used for a D2D communication, in response to the selection of the D2D communication mode, wherein the spectrum used for the D2D communication has an associated D2D transmission priority determined based on the load level of the detected spectrum, and wherein the spectrum with a higher load level has a lower D2D transmission priority.

In some embodiments, the D2D transmission priority comprises: a high priority which represents that the D2D device performs the D2D communication on the spectrum without a need of avoiding a cellular communication; and a low priority which represents that the D2D device performs the D2D communication on the spectrum with the need of avoiding the cellular communication.

In some further embodiments, the step of notifying the pair of D2D devices of the selected mode may further comprise: notifying the pair of D2D devices of an interference threshold for the D2D communication on the spectrum, if the spectrum used for the D2D communication has the low priority.

In some embodiments, the step of selecting the cellular communication mode or the D2D communication mode may comprise: deciding whether there exists a spectrum so that a communication performance of the D2D communication is better than a communication performance of the cellular communication, based on the spectrum detection result; and selecting the D2D communication mode and determining a spectrum used for the D2D communication if the spectrum exists; otherwise, selecting the cellular communication mode.

In some embodiments, the step of deciding whether there exists a spectrum so that a communication performance of the D2D communication is better than a communication performance of the cellular communication may comprise: comparing the communication performance of the cellular communication with an optimal communication performance of the D2D communication among available spectrums; determining that there does not exist such a spectrum on which the communication performance of the D2D communication is better than the communication performance of the cellular communication, if the communication performance of the cellular communication is better than the optimal communication performance; otherwise, determining that there exists such a spectrum on which the communication performance of the D2D communication is better than the communication performance of the cellular communication, wherein the determining a spectrum used for the D2D communication comprises: determining a spectrum having the optimal communication performance as the spectrum used for the D2D communication.

In some further embodiments, the step of comparing the communication performance of the cellular communication with an optimal communication performance of the D2D communication among available spectrums may comprise: receiving channel state information and user information from the pair of D2D devices; determining, based on the channel state information and the user information, the communication performance of the cellular communication and the optimal communication performance of the D2D communication on the available spectrums; and comparing, based on a predetermined criterion, the communication performance of the cellular communication and the optimal communication performance of the D2D communication.

In some embodiments, the channel state information comprises channel state information of a D2D channel and a cellular channel on the available spectrums, and wherein the user information comprises at least one of: a length of data of the D2D device to be transmitted, a fault tolerance, a detection probability, a possible transmission time and a preferred spectrum.

In some embodiments, the available spectrums have spectrum load levels lower than a predetermined threshold.

In some embodiments, the method may further comprise, before receiving data of the spectrum detection from the pair of D2D devices: selecting, in accordance with a load capacity of a cellular network, the cellular communication mode or the D2D communication mode for the D2D device requesting for communication; and notifying the pair of D2D devices of a spectrum to be detected, in response to the selection of the D2D communication mode.

In some embodiments, spectrum resources are allocated among more than one pair of the D2D devices according to a predetermined rule, when the more than one pair of the D2D devices are notified to perform D2D communication.

In a second aspect, a cellular network access method for a communication device is provided. The method comprises: performing a spectrum detection on a designated spectrum; transmitting, to a base station, a result of the spectrum detection which indicates a load level of the detected spectrum; receiving, from the base station, an instruction indicating whether a cellular communication mode or a D2D communication mode is to be used; and performing a communication according to the communication mode indicated by the instruction.

In some embodiments, when the instruction indicates the D2D communication mode to be used, the instruction further indicates a spectrum used for a D2D communication, which has an associated D2D transmission priority, wherein the D2D transmission priority is determined based on the load level of the detected spectrum, and the spectrum with a higher load level has a lower D2D transmission priority.

In some embodiments, when the D2D transmission priority is a high priority, the performing comprises: performing the D2D communication on the indicated spectrum without a need of avoiding a cellular communication; and when the D2D transmission priority is a low priority, the performing comprises: performing the D2D communication at the indicated spectrum, and stopping using the spectrum when the cellular communication is detected.

In some embodiments, when the D2D transmission priority is the low priority, the instruction also indicates an interference threshold for the D2D communication on the spectrum; and the performing comprises: performing the D2D communication on the indicated spectrum; and controlling a transmission power to make an interference generated by the D2D communication lower than the interference threshold.

In some embodiments, the method may further comprise: releasing the currently used spectrum if a communication quality of the D2D communication becomes lower than a predetermined threshold, during the D2D communication; and repeating the method.

In some embodiments, in the result of the spectrum detection, at least three levels are used to indicate the load level of the detected spectrum.

Additionally, the load level may be represented by any one of an average sensed power and a detection probability.

In a third aspect, a base station is provided. The base station comprises: a receiving unit for receiving, from a pair of D2D devices, a result of a spectrum detection which indicates a load level of a detected spectrum; a selecting unit for selecting a cellular communication mode or a D2D communication mode based on the result of the spectrum detection; and a transmitting unit for notifying the pair of D2D devices of a result of the selecting.

In a fourth aspect, a communication device is provided. The communication device comprises a detecting unit for performing a spectrum detection on a designated spectrum; a transmitting unit for transmitting, to a base station, the spectrum detection result which indicates a load level of the detected spectrum; a receiving unit for receiving, from the base station, an instruction which indicates whether a cellular communication mode or a D2D communication mode is to be used; and a communicating unit for performing a communication according to the communication mode indicated by the instruction.

It should be noted that corresponding embodiments of the first aspect may also be applied to the third aspect. Similarly, corresponding embodiments of the second aspect may also be applied to the fourth aspect.

According to particular embodiments of the technologies described in the present application, with detecting the spectrum by the D2D device, it is possible to flexibly switch between the cellular communication mode and the D2D communication mode according to the result of spectrum detection, thereby effectively improving the spectrum utilization of the network. Further, in some embodiments, when the D2D communication mode is used, corresponding D2D transmission priorities are allocated to the spectrums used for the D2D communication, thereby improving the spectral efficiency to an extreme and reducing the interference to the cellular users.

Advantageous Effects of Invention

A communication system performance may be improved.

BRIEF DESCRIPTION OF DRAWINGS

Further features, objects and advantages of the present application will be more apparent with a review of a detailed description of the non-limiting embodiments set forth below with reference to the attached drawings.

BEST MODE FOR CARRYING OUT THE INVENTION

Hereinafter, embodiments of the present application will be further explained in detail with reference to the accompanying drawings. It should be understood that specific embodiments described herein only intend to explain the relevant invention, rather than to limit the invention. In addition, it should be noted that only the portions related to the present invention are shown in the accompanying drawings for ease of description.

It should be noted that the embodiments, and features in the embodiments of the present application may be combined unless they conflict with each other. Hereinafter, the present application will be explained in detail with reference to the accompanying drawings in connectivity with the embodiments.

Hereinafter, a base station (BS) is an access apparatus for accessing a communication apparatus to a cellular network and is used to allocate communication resources to the communication apparatus. The base station may be any one entity of an enhanced Node B (eNB), a Node B, a radio access unit, a base station controller, a base transceiver station and etc. The communication apparatus may be any apparatus intended to access to services via access networks and may be configured to communicate through the access networks. For example, the communication apparatus may comprise, but not limit to, a user equipment (UE), a mobile station (MS), a cellular phone, a smart phone, a computer or a multimedia system with communication functions. It should be noted that terms "communication apparatus", "user equipment" and "user terminal" may be used interchangeably hereinafter.

It should also be noted that, although various embodiments are described in a LET/LTE-A cellular network for the purposes of illustration, those skilled in the art may realize that the disclosed embodiments may also be applied to various types of cellular networks and may also be expanded to other systems employing time-domain interference coordination.

Considering that the classification of the overlay and underlay modes of the in-band D2D is very similar to the classification in the cognitive radio network, the present application provides a spectrum sensing based cellular network access scheme for a D2D device. In the spectrum sensing based D2D communication scheme, the user equipment needs to have ability of spectrum sensing, which is available under the development of modern smart phone's functions, since the smart phone has various sensing components.

In the proposed cellular network accessing scheme, it is possible to flexibly switch between a cellular communication mode and a D2D communication mode based on the result of the spectrum detection of the spectrum of the cellular network detected by the D2D device, thereby effectively improving the spectrum utilization of the network. In the present application, D2D communication mode may be referred to as D2D mode, and cellular communication mode may be referred to as cellular mode.

When the D2D communication mode is used, both the overlay mode and the underlay mode of the in-band D2D communication combined by the spectrum sensing technology results in a larger throughput than either the overlay mode or the underlay mode. For example, the underlay mode will consider the interference of the D2D link to the cellular link regardless of the occupation of the cellular link, which may make the D2D link lose a part of the spectrum resources when the cellular link is free, resulting in wasting. In addition, since the frequency band used in the D2D communication is licensed and legal, the limitations and the obstacles encountered by the cognitive radio will be avoided. Further, since the classification of the communication modes of the in-band D2D is very similar to the classification in the cognitive radio network, the development of the spectrum sensing in the researches of the cognitive radio may be directly applied to the D2D communication.

Figure 1:
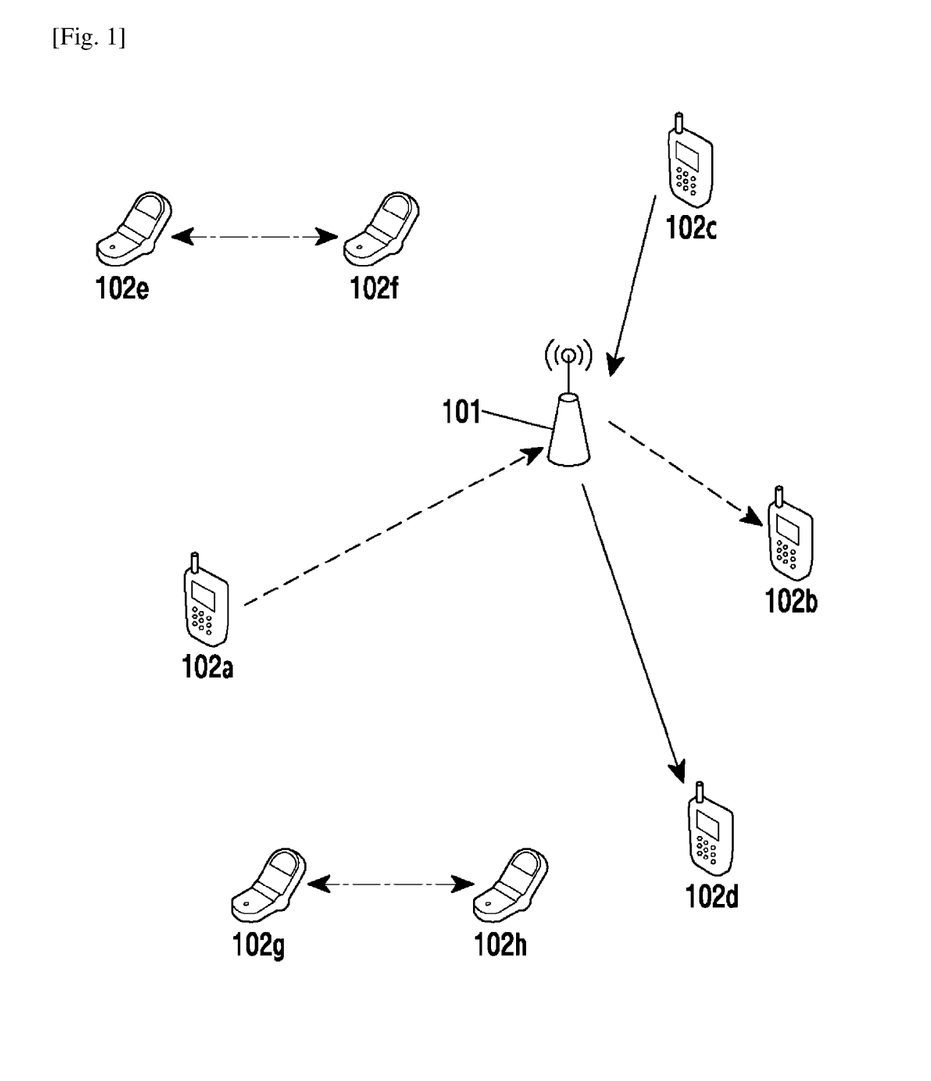
FIG. 1 illustrates an exemplary scenario in which an embodiment of the present application may be applied.

FIG. 1 illustrates an exemplary scenario in which the present application may be applied. In particular, FIG. 1 exemplarily illustrates a concept of D2D communication in a LET-A network. Unlike uplink and downlink resources used in the cellular communication, the direct connection between the communication devices is supported by end-to-end communication or peer-to-peer communication in the D2D communication. Some exemplary applications of the D2D communication may comprise multi-media downloading, video stream transmitting, on-line gaming, end-to-end file sharing, etc.

FIG. 1 illustrates a base station 101 and a plurality of communication devices 102 communicating in coverage of the base station 101 (not shown, the coverage is also called a cell). The base station 101 is capable of communicating with wireless devices such as the communication devices 102 in the coverage. The communication devices 102 may communicate with each other using the cellular communication link via the base station 101. For example, a cellular communication device 102a communicates with a cellular communication device 102b via the base station 101; and a cellular communication device 102c communicates with a cellular communication device 102d via the base station 101. The communication devices may communicate with each other by using direct connection, i.e. performing D2D communication. For example, FIG. 1 illustrates two pairs of D2D devices. The communication devices 102e and 102f directly communicate with each other and constitute a pair of D2D devices. The communication devices 102g and 102h directly communicate with each other and constitute another pair of D2D devices. For the sake of simplification, hereinafter, the communication device using the cellular communication may be called a cellular device, and the communication device using the D2D communication may be called a D2D device.

In some implementations, the base station 101 is implemented as a base station of an evolved Node B (eNB) type complying with for example LTE. The base station 101 may have a wired or wireless backhaul link to other network nodes, such as other base stations, radio network controllers, core networks, service gateways, etc.

The communication device may be a mobile and/or fixed device. Further, the communication device may also be called a mobile station, a mobile unit, a subscriber station, a wireless terminal, a terminal or the like. The communication device may be implemented as a wireless handheld device, a wireless connector accessory, etc. For example, the communication device may be implemented as a radio phone, a computer wirelessly-connected to a network, etc. In some examples, the communication device may comprise one or more of: at least one processor, at least one computer readable storage medium (for example, a memory, a storage means and so on), a wireless accessing mechanism and a user interface.

Note that, although only one base station 101 is shown in FIG. 1, there may be a plurality of base stations in practice. Further, there may be many communication devices in the cell of the base station 101, and the D2D pair may be more complicated than that shown in FIG. 1. It should be understood by those skilled in the art that the scenario shown in FIG. 1 is schematically shown as an environment in which an embodiment of the present application may be applied.

Figure 2:
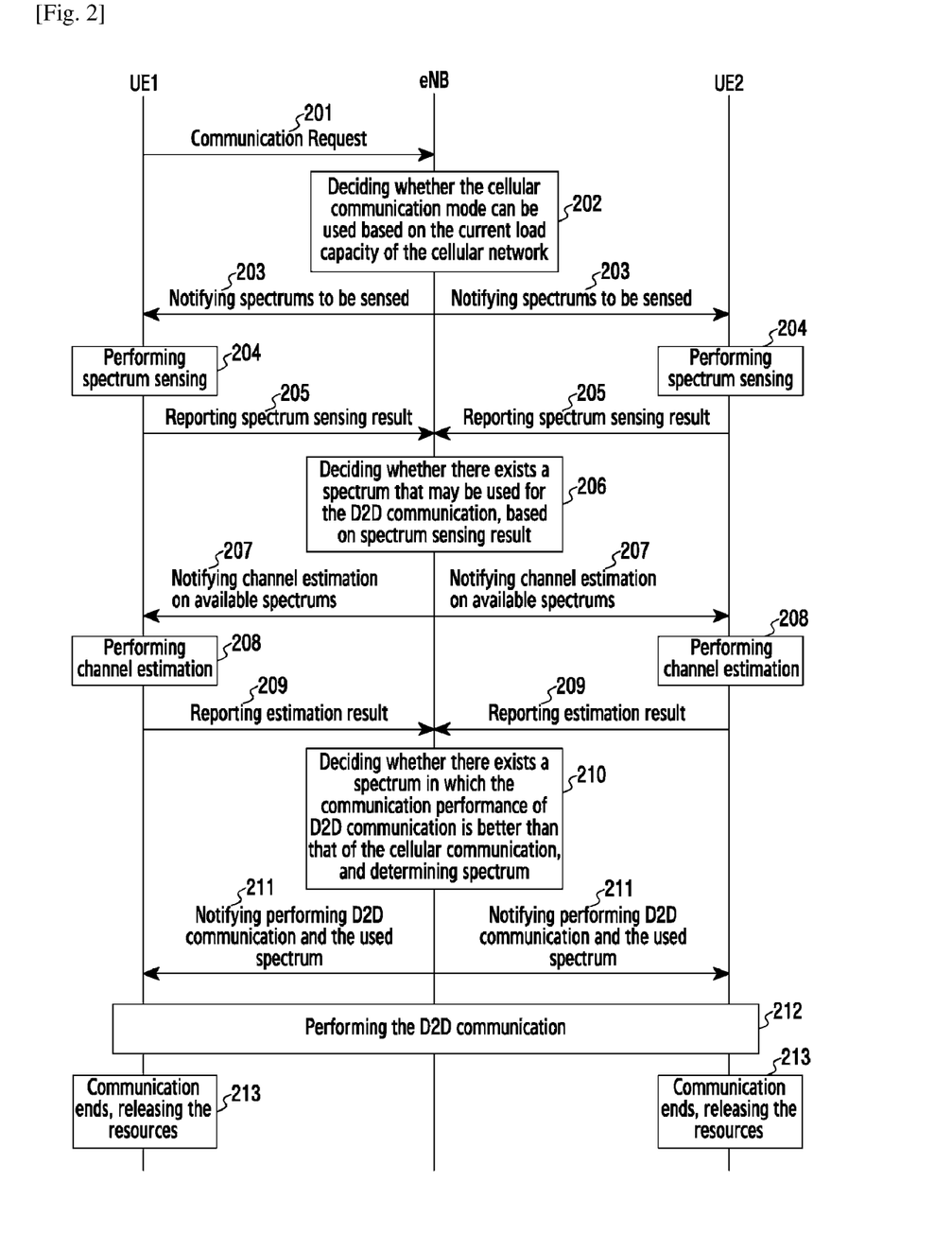
FIG. 2 illustrates an example of a signaling flow according to an embodiment of the present application.

FIG. 2 illustrates an example of a signaling flow between a pair of D2D devices and the base station according to an embodiment of the present application. It should be understood by those skilled in the art, for the purposes of illustration and explanation, one or more specific technical details are illustrated and described in the following description, but embodiments of the present application may be implemented without these features. In the embodiment shown in FIG. 2, a communication of a pair of D2D devices of a UE1 and a UE2 is illustrated by way of example.

As shown in FIG. 2, in step 201, the communication device UE1 transmits a communication request to another communication device UE2 via the base station eNB. The communication request may be used for request for transmitting voice or data. For example, some exemplary communication applications may comprise voice calling, video calling, multi-media downloading, video stream transmitting, on-line gaming, file sharing, etc.

Then, in step 202, alternatively, the base station eNB may decide which communication mode to be used based on the current load capacity of the cellular network. If the load of eNB is acceptable, for example lower than a predetermined load threshold, UE1 and UE2 are allowed to communicate with each other; otherwise if the load of eNB is unacceptable, a D2D communication may be considered to perform between UE1 and UE2, thereby achieving load transfer. In some embodiments, UE1 and UE2 may set permissions for the D2D communication. In these embodiments, eNB needs to determine whether UE1 has the permission to communicate with UE2, and if not, UE1 is informed of performing a cellular communication.

When UE1 and UE2 are allowed to perform the D2D communication, in step 203, eNB notifies UE1 and UE2 of selectable spectrums, and demands UE1 and UE2 to perform spectrum sensing on these possible selectable spectrums. For example, assuming eNB currently has ten allocable D2D spectrum resources $f_1$, $f_2$, $f_3$, $f_4$, $f_5$, $f_6$, $f_7$, $f_8$, $f_9$ and $f_{10}$ then eNB may inform UE1 and UE2 of the ten spectrum resources which may be sensed.

Then, in step 204, UE1 and UE2 may perform spectrum sensing or spectrum detection on spectrum resources designated by the eNB, respectively.

Spectrum sensing is derived from Cognitive Radio (CR). The predominant idea of the Cognitive Radio is to achieve opportunistic dynamic spectrum access, i.e. an unlicensed user (also called a secondary user or a cognitive user) may opportunistically access, by detecting, the free frequency band which has been allocated to a licensed user (or a master user) but is seldom used or even unused, and once the master user accesses the frequency band again, the secondary user quickly leaves the channel. The spectrum sensing means the cognitive user obtains spectrum usage information of the wireless network by various signal detecting and processing methods. The cognitive user detects the presence of the master user by the spectrum sensing to utilize spectrum holes.

For each user equipment, the spectrum sensing technology mainly relates to local spectrum sensing. The local spectrum sensing means a single cognitive user independently performs a certain detecting algorithm to sense the usage of the spectrum, and the detection performance of the local spectrum sensing is measured by a false alarm probability and a false dismissal probability. The common local spectrum sensing technologies comprise power sensing, matching-filter sensing, cyclostationarity sensing, etc. The primary principle of power sensing is measuring the total power of received signals during a particular measuring period on a particular frequency band. Matching-filter sensing is an optimal detecting algorithm when the prior information of a master user signal (such as modulation type, pulse shaping, frame format, etc) is known, and its advantage is that the signal-to-noise ratio of the detection can be maximized. The principle of cyclostationarity sensing is to obtain the associated statistic characteristics of signal spectrum by analyzing the cyclic autocorrelation function or the two-dimensional spectrum correlation function, and distinguish the main signal from the noise by using the periodicity thereof. The present application may utilize any spectrum sensing technology which is known or will be developed in the further. The present application has no limitation in this aspect.

Based on the used spectrum sensing mode and the selected target function, the data of spectrum detection may be presented in different forms. For example, when the power sensing is used, the data of the spectrum detection may be the average power detected at each spectrum. Further, for example, when the detecting method such as cyclostationarity sensing is used, the data of the spectrum detection may be detection probabilities of the master user signals detected at each spectrum. The present application has no limitation in this aspect. Regardless of the used spectrum sensing technologies, the obtained data of the spectrum detection intends to indicate the usage of the detected spectrum, i.e. the load level.

Then, in step 205, UE1 and UE2 report the result of the spectrum detection to the base station.

In some embodiments, UE1 and UE2 may directly transmit the obtained data of the spectrum detection. For example, the communication device may report the detected power of each spectrum to the base station for analysis. Further, for example, the communication device may also report the detection probability that the master user signal is detected at each spectrum to the base station.

In other embodiments, UE1 and UE2 may classify the detected spectrum into several levels according to a predetermined rule and report the classification results to the base station. The predetermined rule is based on the used spectrum sensing mode and the selected target function. For example, the classification may be performed spectrum according to the average sensed power or according to the detection probability. Regardless of the classifying method, it is intended to indicate the usage of the detected spectrums, i.e. the load level. It is possible to advantageously reduce amount of the data to be transmitted by reporting the classification result instead of the actually detected data of the spectrum detection, thereby accelerating the process.

In an implementation, the sensed spectrums are classified into three levels, i.e. a high level, a medium level and a low level. If the load level of a spectrum is higher than a first predetermined threshold, the spectrum belongs to the "high" level. If the load level of a spectrum is lower than the first predetermined threshold but higher than a second predetermined threshold, the spectrum belongs to the "medium" level. If the load level of a spectrum is lower than the second predetermined threshold, the spectrum belongs to the "low" level. A spectrum with the "high" level refers to a spectrum being always or mostly occupied, for example, used for the cellular communication, and its load level is higher and it is difficult to access to another communication device. A spectrum with the "medium" level refers to a spectrum with communication thereon but being not always occupied, and it is possible to access to other communication devices. A spectrum with the "low" level refers to a spectrum being substantially unoccupied and it is possible to access to other communication devices. For example, UE1 and UE2 may report the following detection results to the base station: $f_8$, $f_9$ and $f_{10}$ are "high" level spectrums; $f_4$, $f_5$, $f_6$ and $f_7$ are "medium" level spectrums; and $f_1$, $f_2$ and $f_3$ are "low" level spectrums. Depending on the positions and the spectrum sensing performances of UE1 and UE2, the results of the detection reported by UE1 and UE2 to the base station may be the same or different, and the base station may analyze the usage of the spectrums by synthesizing the detection results of UE1 and UE2.

Compared to a binary result outputted by the spectrum sensing in the known spectrum detecting technology, i.e. the spectrum being available/not available, or the spectrum being occupied/not occupied, a triple result outputted in the present embodiment may help to more finely distinguish the usage of the spectrum, facilitating sequential usage of the spectrum and interference control.

It should be understood by those skilled in the art that the above-mentioned level classification is only exemplary, and in other implementations, the sensed spectrums may be classified into more levels and corresponding conditions may be provided for each level, thereby achieving finer interference control.

After receiving the spectrum detection results of the communication devices UE1 and UE2, in step 206, the base station eNB may determine whether there is a spectrum which may be used for D2D communication between UE1 and UE2 based on the results of the spectrum detection.

If the received result of the spectrum detection is actual data of the spectrum detection obtained by the communication device, the base station eNB may classify the detected spectrum into several levels according to the data of the spectrum detection and a predetermined rule. This predetermined rule may be the same as the predetermined rule used for classifying the detected spectrum into various levels in the communication devices UE1 and UE2, thereby employing the same classification criterion on the user equipment side and the network side. In one implementation, eNB classifies the spectrums detected by the communication device into three levels, i.e. the high level, the medium level and the low level. If the load levels of all of spectrum are higher than the first predetermined threshold, that is, all of the spectrum belong to the "high" level; and the base station eNB may determine that there does not exist spectrum suitable for the D2D communication. Then, the base station eNB may notify UE1 and UE2 of performing the cellular communication.

If the received results of the spectrum detection are the classification results of the detected spectrum in the above-mentioned embodiment, the base station eNB may directly decide whether all of the spectrum belong to a particular level, for example the "high" level spectrum. If all of the spectrum belong to the "high" level, the base station eNB may determine that there does not exist a spectrum suitable for the D2D communication and directly notify UE1 and UE2 of performing the cellular communication.

If not all of the load levels of the spectrums are higher than the first predetermined threshold, or not all the spectrum belong to the "high" level, the base station eNB may continue with the following steps to determine whether there exists a spectrum so that the communication performance of D2D communication is better than that of the cellular communication.

As shown in FIG. 2, in step 207, eNB may notify the pair of UE1 and UE2 of performing a channel estimation for a spectrum which may be suitable for the D2D communication (an available spectrum for short), that is, to perform the channel estimation for the spectrum the load level of which is lower than a predetermined threshold or the spectrum belonging to the "medium" or the "low" level.

In step 208, UE1 and UE2 perform corresponding channel estimations after receiving instructions from eNB. UE1 and UE2 may perform estimations of channel (including direct channel between UE1 and UE2 and respective channels between each of UE1 and UE2 and eNB) on the available spectrum. There are mature channel estimation technologies in the art, and the detailed description thereof will be omitted herein.

Then, in step 209, UE1 and UE2 report the results of the channel estimations to eNB. Alternatively, UE1 and UE2 may actively perform channel estimations for the available spectrum, and report the results of the channel estimations to eNB when receiving the above-mentioned instructions from eNB. In addition, alternatively, UE1 and UE2 may actively perform channel estimations for the available spectrums, and report the data of the spectrum detection to eNB together with the results of the channel estimations. The present application is not limited in an aspect of reporting various information to the eNB.

In some embodiments, UE1 and UE2 may transmit information of the channel estimations directly. In other embodiments, UE1 and UE2 may select several proper spectrums (i.e. preferred spectrums) from the available spectrums according to respective transmission requirements, for example, array length of the data to be transmitted, fault tolerance, etc, and sort these spectrums according to their priorities, and report the sorting result to the eNB.

Alternatively or additionally, UE1 and UE2 may report some user information to eNB for use of eNB in determination. The user information may be for example the transmission requirements of the communication device, such as the array length of data to be transmitted, fault tolerance, possible transmission duration, etc.

In one implementation, the possibly consumed transmission time $t_i$ (i represents the serial number of the available spectrums, i=1, 2, 3, 4, 5, 6, 7) may be calculated as follows:

$$t_i = L/R_i \quad (1)$$

where L represents the length of data to be transmitted and $R_i$ represents an equivalent transmission rate. $R_i$ can be calculated as follows:

$$R_i = \gamma_i C_i \quad (2)$$

where $C_i$ represents the theoretical rate for a D2D user performing data transmission at the i-th spectrum, for example, $C_i$ is the theoretical value of the transmission rate calculated in accordance with the Shannon's formula with respect to a practical channel; and $\gamma_i$ represents the corresponding rate attenuation factor of the practical encoding mode, for example $\gamma_i$ of different constellations may be obtained by table lookups.

Then, in step 210, eNB decides whether there exists a spectrum so that the communication performance of the D2D communication is better than the communication performance of the cellular communication based on the received data of the spectrum detection, channel estimation results and alternatively based on the received user information, and confirms this spectrum.

In one implementation, deciding whether there exists a spectrum so that the communication performance of the D2D communication is better than the communication performance of the cellular communication may comprise comparing the communication performance of the cellular communication with the optimal communication performance of the D2D communication among the available spectrums. In one implementation, the communication performance of the cellular communication may be determined as an average communication performance of all or part of the available spectrums. If the communication performance of the cellular communication is better than the optimal communication performance of the D2D communication among the available spectrums, it can be determined that there does not exist such a spectrum on which the communication performance of the D2D communication is better than the communication performance of the cellular communication; otherwise, if the optimal communication performance of the D2D communication among the available spectrums is better than the communication performance of the cellular communication, it can be determined that there exists the spectrum so that the communication performance of the D2D communication of the spectrum is better than the communication performance of the cellular communication of the spectrum, and such spectrum may be determined as the spectrum to be used for the D2D communication.

The communication performance may be represented by various parameters, comprising but not limited to, a signal-to-noise ratio, a Quality of Service (QoS), transmission time, etc. In one implementation, eNB may decide whether there exists a spectrum suitable for D2D transmission according to the requirements of high rate, high spectrum efficiency. In this implementation, for example, the communication performance may be measured by using the transmission time, here a spectrum maximizing $t_i$, $\max(t_i)$ is selected. According to such requirement, the selected spectrum may be occupied for a long time, thereby minimizing the probability of breakdown communication.

Then, in step 211, in response to the determination that there exists the spectrum so that the communication performance of the D2D communication of the spectrum is better than the communication performance of the cellular communication of the spectrum, eNB notifies UE1 and UE2 to perform the D2D communication and inform UE1 and UE2 of the spectrum used for the D2D communication.

Further, the spectrum used for the D2D communication may have an associated D2D transmission priority. The D2D transmission priority is used for indicating the precedence level of a D2D device performing the D2D communication on the spectrum compared to the cellular communication of a cellular communication device. The D2D transmission priority is determined based on the load level of the detected spectrum, and the spectrum with a higher load level has a lower D2D transmission priority. In some embodiments, the classification criterion of the D2D transmission priority may be the same as the above-mentioned classification criterion of the levels of the spectrums.

In some embodiments, the D2D transmission priorities comprise a high priority and a low priority associated with the "low" level spectrum and the "medium" level spectrum, respectively. The high priority represents that the D2D device performs the D2D communication on this spectrum without the need of avoiding the cellular communication, and the low priority represents that the D2D device performs the D2D communication on this spectrum with the need of avoiding the cellular communication. Further, performing the D2D communication at a spectrum of the low priority also needs to control the interference to other users within a certain range, thereby making full use of the spectrum resources and simultaneously controlling the interference to users with the high priority on this spectrum.

It is possible to furthest improve the spectral efficiency and reduce the interference to the cellular users by the classification of various D2D transmission priorities to finely use the available spectrums.

In one implementation, eNB may specify in the instruction the D2D transmission priorities of the spectrums used for the D2D communication, for example in particular when the classification of the sensing result at the communication device is different from the classification of the overall result at eNB. In another implementation, eNB does not need to indicate the D2D transmission priority of the spectrum, while the communication device may decide the D2D transmission priority based on the sensed result of its own. For example, the communication device may determine the spectrum whose sensed result has the "low" level has the high priority and the spectrum whose sensed result has the "medium" level has the low priority. Further, for a spectrum with the low priority, eNB also needs to indicate an interference threshold for the D2D communication on this spectrum to control the interference to the cellular communication. For example, eNB may determine, according to a certain interference controlling algorithm, the interference threshold for the communication device in the D2D communication. The interference threshold may be represented by various parameters for example a highest transmission power, an interference temperature threshold, etc. A method for determining an interference temperature to other users may comprise determining the product of the transmission power of a D2D user and the square of the actual channel module as the interference temperature.

Then, in step 212, UE1 and UE2 perform the D2D communication at the determined spectrum according to the indication of eNB.

If the spectrum has the high priority, UE1 and UE2 may perform the D2D communication on this spectrum as users with the highest priority without the need of avoiding other communication. This pair of the D2D devices may periodically monitor neighboring spectra, or may only monitor the neighboring spectra when needed, for example when the detected communication quality of the D2D communication is lower than a predetermined quality threshold.

If the spectrum has the low priority, UE1 and UE2 perform the D2D communication on this spectrum as users with the low priority and sense the spectrum. Once the cellular communication is sensed, the spectrum cannot be used. In other words, the D2D users need to avoid the users with the high priority, for example the cellular user, in real time. Once the spectrum cannot be used, the D2D users need to request eNB to allocate new communication resources and report the result of the spectrum sensing, i.e. repeating the method described in FIG. 2. Therefore, in some embodiments, the device which performs the D2D communication on a spectrum with the low priority needs to continually monitor the neighboring spectra to report the result of the sensing immediately. Further, the device which performs the D2D communication on a spectrum with the low priority also needs to control the interference to other users within a certain range, for example within the interference threshold indicated by eNB. In particular, the pair of D2D devices may control their transmission power to make the generated interference no more than the interference threshold.

In addition, for a user with the low priority, eNB may further control its priority in real time. For example, when sensing that the load level of the used spectrum is lower than the second predetermined threshold, i.e. the used spectrum belongs to the "low" level, the pair of D2D devices with the low priority will report the result to eNB. Then, eNB may modify the transmission priority of the spectrum according to the result, so that the pair of D2D devices becomes the user with the high priority on this spectrum. On the other hand, when sensing that the load level of the used spectrum is higher than the first predetermined threshold, i.e. the used spectrum belongs to the "high" level, the pair of D2D devices with the low priority need to release the used spectrum at once and report the result of the spectrum sensing to eNB and request for allocating new communication resources.

Further, during the D2D communication, the pair of D2D devices, either the users with the high priority or the users with the low priority, may periodically monitor the communication quality. When the detected communication quality becomes poor, for example lower than the predetermined quality threshold, due to for example the increasing distance between each other, the pair of D2D devices may request eNB to allocate new communication resources, for example finding another available spectrum to perform the D2D communication or switching to the cellular communication. Here, the pair of D2D devices and eNB repeat the method described in FIG. 2.

Finally, in step 213, when the communication ends, UE1 and UE2 release the used spectrum resources and inform the base station of the releasing.

The cellular network access method according to embodiments of the present application is described above in connection to the signaling interactive flow of FIG. 2. FIG. 2 takes an example of a pair of the user devices UE1 and UE2 for the purposes of description. It should be understood by those skilled in the art that the same method is also applicable to a scenario in which there are more than one pair of D2D devices or more than one group of D2D devices.

When more than one group of the D2D devices exist in the coverage of a same eNB, for example the D2D communication is required to be performed between UE1 and UE2, and between UE3 and UE4, and thus a conflict may occur in the resource allocation between different D2D communication after sensing. Here, when the base station notifies the groups of D2D devices of performing the D2D communication, the spectrum resources should be allocated between the D2D devices according to a predetermined rule. The operating method of the base station eNB, the user group UE1 and UE2 and the user group UE3 and UE4 is the same as steps 201 to 209 as described in FIG. 2, except that in step 210, the corresponding spectrums used for the D2D communication are allocated to respective D2D device according to a certain resource allocating criterion, thereby avoiding the conflict.

In particular, in step 210, eNB decides whether there exists a spectrum so that the communication performance of the D2D communication is better than the communication performance of the cellular communication, and determines the spectrum used for the D2D communication for the user groups UE1 and UE2, and UE3 and UE4. Similarly, in one implementation, the spectrum of the maximum of the transmission time $t_i$, i.e. $\max(t_i)$ is determined for the user groups UE1 and UE2, and UE3 and UE4, respectively. The possible conflicts are described in different conditions as follows.

Condition (1): The serial number i of $\max(t_i)$ of the user group UE1 and UE2, and that of the user group UE3 and UE4 are serial numbers of "low" level spectrums.

Condition (1.1): The serial numbers i are different, for example i=1 optimally for the user group UE1 and UE2, and i=2 optimally for the user group UE3 and UE4. Then, eNB notifies the user group UE1 and UE2 to perform the D2D communication by using $f_1$, and notifies the user group UE3 and UE4 to perform the D2D communication by using $f_2$. Now, the user group UE1 and UE2 and the user group UE3 and UE4 are high priority users and may perform the D2D communication in accordance with the requirements for the high priority users.

Condition (1.2): The serial numbers i are the same. Then, eNB may allocate the spectrum resources according to other additional information. For example, eNB may allocate the spectrum resources according to user information of the user group UE1 and UE2 and that of the user group UE3 and UE4, for example the reported or calculated transmission time. In one example, it is assumed that the transmission time of the user group UE1 and UE2 using a frequency point $f_i$ is $t_{1,2,i}$, the transmission time of the user group UE3 and UE4 using $f_i$ is $t_{3,4,i}$, and $t_{1,2,i} > t_{3,4,i}$. In this example, eNB may notify the user group UE1 and UE2 to communicate by using the frequency point $f_i$, thereby ensuring the long-time transmission of the user group UE1 and UE2. In addition, eNB notifies the user group UE3 and UE4 to communicate by using the frequency point $f_{\bar{i}}$, where $\bar{i}$ is the serial number of the optimal available spectrum among available spectrums other than the i-th frequency point.

Condition (2): The serial number i of $\max(t_i)$ of the user group UE1 and UE2, and that of the user group UE3 and UE4 are serial numbers of "medium" level spectrums. The specific classification of condition (2) is similar to that of condition (1), which will not be repeated herein.

It should be noted that since the used spectrums are "medium" level spectrums, and thus the user group UE1 and UE2 and the user group UE3 and UE4 are all low priority users. Then, eNB further indicates that the interference of these user groups to other users must be controlled within the interference threshold. The low priority users also need to sense the used spectrums during the communication, and once the high priority users, for example the cellular user, are sensed, then this spectrum should be stopped. Further, the low priority users also need to monitor the neighboring spectra during the communication to report the result of the sensing immediately. Additionally, in respect of the low priority users, eNB may also control the priorities of the low priority users in real time, as can be seen in the description in connection to FIG. 2.

Condition (3): The serial number i of max($t_i$) of the user group UE1 and UE2, and that of the user group UE3 and UE4 are the serial number of the "low" level spectrum and the serial number of the "medium" level spectrum, respectively. In one example, it is assumed that the serial number i=1 of "low" level spectrum is the optimal for the user group UE1 and UE2, and the serial number i=4 of "medium" level spectrum is the optimal for the user group UE3 and UE4. Then, there is no conflict between the two user groups, and eNB may notify each user group respectively. In particular, eNB may notify the user group UE1 and UE2 to perform the D2D communication by using $f_1$, and notify the user group UE3 and UE4 to perform the D2D communication by using $f_4$. Since $f_4$ has the low priority, eNB further indicate that the interference of the D2D communication of the user group UE3 and UE4 to other users must be controlled within the interference threshold. The user group UE3 and UE4 perform the D2D communication in accordance with the requirements of the low priority users, which will not be repeated herein.

Then, the user devices of each group may perform the D2D communication according to the indications of eNB, as described in steps 212 and 213 in FIG. 2.

Figure 3:
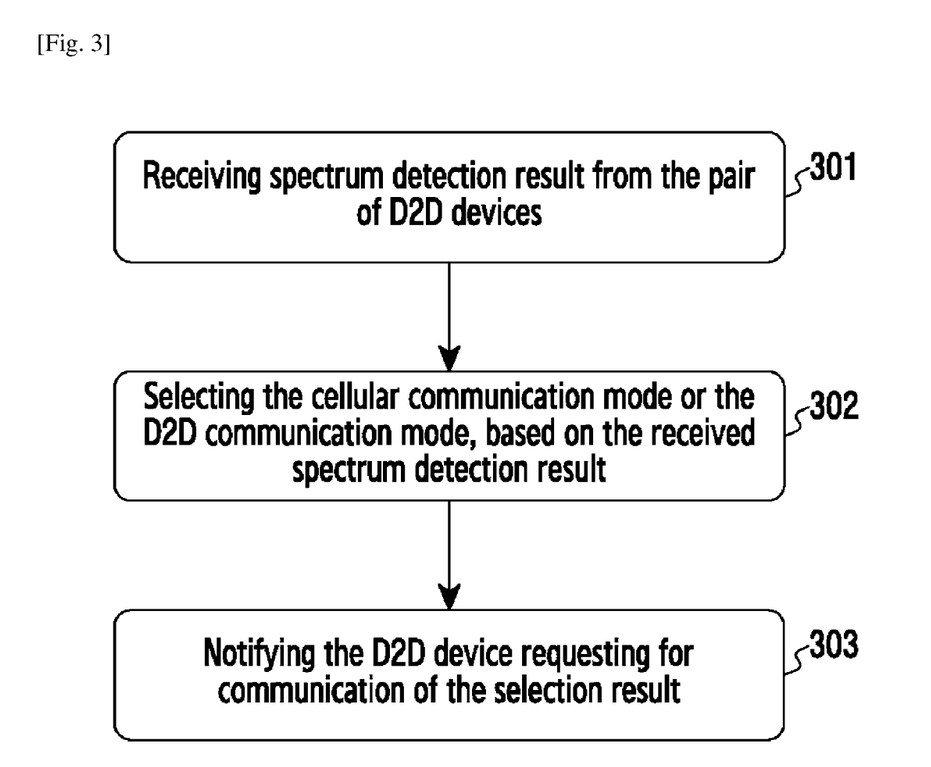
FIG. 3 illustrates an exemplary flow 300 of a method for a base station according to an embodiment of the present application.

FIG. 3 illustrates an exemplary flow 300 of a method for a base station according to an embodiment of the present application. The method as illustrated in FIG. 3 is performed when the communication request of a D2D device is received for the first time, or when the D2D device requests the base station to re-allocate resources in response to the quality of the communication decreasing.

As shown in FIG. 3, in step 301, the base station receives a result of spectrum detection from the pair of D2D devices requesting for communication. The result of the spectrum detection indicates of the load level of the spectrum detected by the pair of D2D devices. In one implementation, at least three levels, for example a high level, a medium level and a low level, are used to indicate load levels of the detected spectrum in the result of the spectrum detection.

Then, in step 302, the cellular communication mode or the D2D communication mode is selected based on the received result of the spectrum detection.

Finally, in step 303, the pair of D2D devices requesting for communication is notified of the result of the selection. In some embodiments, in response to the selection of the D2D communication mode, a spectrum used for the D2D communication is assigned, and the spectrum has an associated D2D transmission priority. The D2D transmission priority is determined based on the detected load level of the spectrum, and the spectrum with a higher load level has a lower D2D transmission priority.

In some embodiments, the D2D transmission priority comprises a high priority and a low priority. For example, a spectrum the detected load level of which is the "low" level has the high priority, and a spectrum the detected load level of which is the "high" level has the low priority. The high priority represents that the D2D device performs the D2D communication on this spectrum without the need of avoiding the cellular communication, and the low priority represents that the D2D device performs the D2D communication on this spectrum with the need of avoiding the cellular communication.

Further, in response to the low priority of the spectrum used for the D2D communication, the base station also notifies the pair of D2D devices of the interference threshold for the D2D communication on this spectrum. Through the D2D communication with conditions, it is possible to make full use of the spectrum resources without too much interference for the existing user.

When more than one group of the D2D devices requests for communication, the base station may allocate the spectrum resources among the groups of the D2D devices in accordance with a predetermined rule. In one implementation, the predetermined rule refers to allocating the optimal resources to the group of the D2D devices having a longer transmission time.

Figure 4:
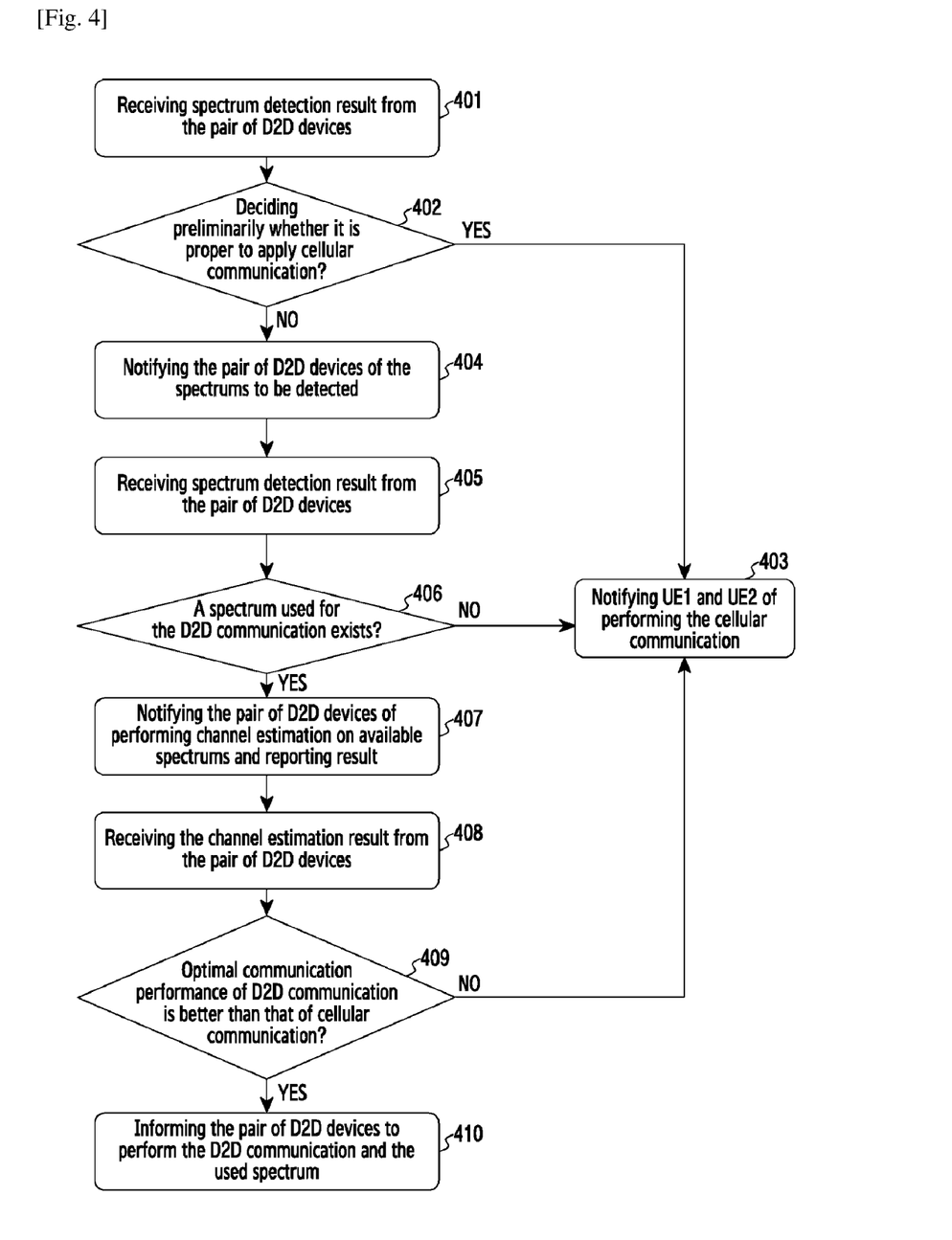
FIG. 4 illustrates another exemplary flow 400 of a method for a base station according to an embodiment of the present application.

FIG. 4 illustrates another exemplary flow 400 of a method for a base station according to another embodiment of the present application. In this exemplary flow, the way by which the base station selects the cellular communication mode or the D2D communication mode is described in details. In addition, some additional operations may be performed in this exemplary flow.

As shown in FIG. 4, the method 400 may start from step 401, in which the base station receives a communication request transmitted by a D2D device UE1 to another D2D device UE2.

Alternatively, in step 402, the base station may preliminarily decide whether it is proper to use the cellular communication. For example, the base station may decide whether it is possible to use the cellular communication mode based on the current load capacity of the cellular network.

If the current load of the cellular network is acceptable, for example lower than a predetermined load threshold, then proceeds with step 403 to notify UE1 and UE2 of performing the cellular communication. If the current load of the cellular network is unacceptable, then UE1 and UE2 may be arranged to perform the D2D communication, thereby achieving load transfer and the method proceeds with step 404.

In step 404, in response to the selection of the D2D communication mode, the base station may notify the pair of D2D devices of the spectrums to be which the spectrum detection needs to be performed. These spectrums are those selected for the D2D communication, including spectrums that are orthogonal to the current cellular link and spectrums that may be multiplexed with the cellular link.

Then, in step 405, the base station receives a result of spectrum detection from the pair of D2D devices. In one implementation, the result of the spectrum detection uses at least three levels, for example a high level, a medium level and a low level, to indicate the load level of the detected spectrum. In another implementation, the base station classifies the detected spectrums into at least three levels, for example a high level, a medium level and a low level, based on the result of the spectrum detection.

The base station may decide whether there exists a spectrum so that the communication performance of the D2D communication is better than the communication performance of the cellular communication, based on the received result of the spectrum detection. If such spectrum exists, the D2D communication mode is selected and the spectrum used for the D2D communication is determined. If such spectrum does not exist, the cellular communication mode is selected.

In particular, in step 406, the base station firstly decides whether there exists a spectrum that may be used for the D2D communication. In one example, the base station may decide whether there exists a spectrum so that the sensing result belongs to the "medium" level or the "low" level.

If such spectrum does not exist, the method proceeds with step 403 to notify UE1 and UE2 to perform the cellular communication. If exists, the base station continues to decide whether there exists, among the available spectrums, a spectrum so that the communication performance of the D2D communication is better than the communication performance of the cellular communication. In particular, the method proceeds to step 407 to notify the pair UE1 and UE2 to perform channel estimations to these spectrums which may be used for the D2D communication and report the result.

Then, in step 408, channel state information is received from the pair of D2D devices. The channel state information may comprise channel state information of the D2D channel and the cellular channel on the available spectrums. Alternatively, the base station may receive user information from the D2D devices. The user information may comprise at least one of: the length of the array of data of the D2D device to be transmitted, a fault tolerance, a detection probability, a possible transmission time and a preferred spectrum. Then the base station may determine the communication performance of the cellular communication and the optimal communication performance of the D2D communication on the available spectrums based on the channel state information and the user information.

In step 409, the base station may compare, based on a predetermined criterion, the optimal communication performance of the D2D communication with the communication performance of the cellular communication, to decide whether the optimal communication performance of the D2D communication is better than the communication performance of the cellular communication. If this is not the case, the method proceeds to step 403 to notify UE1 and UE2 to perform the cellular communication. Otherwise, the base station determines to select the D2D communication mode and determines the spectrum having the optimal frequency performance as the spectrum used for the D2D communication.

Then, in step 410, the base station informs the pair of D2D devices of the determined spectrum used for the D2D communication. Step 410 is the same as step 303 in FIG. 3, which will not be repeated herein.

Figure 5:
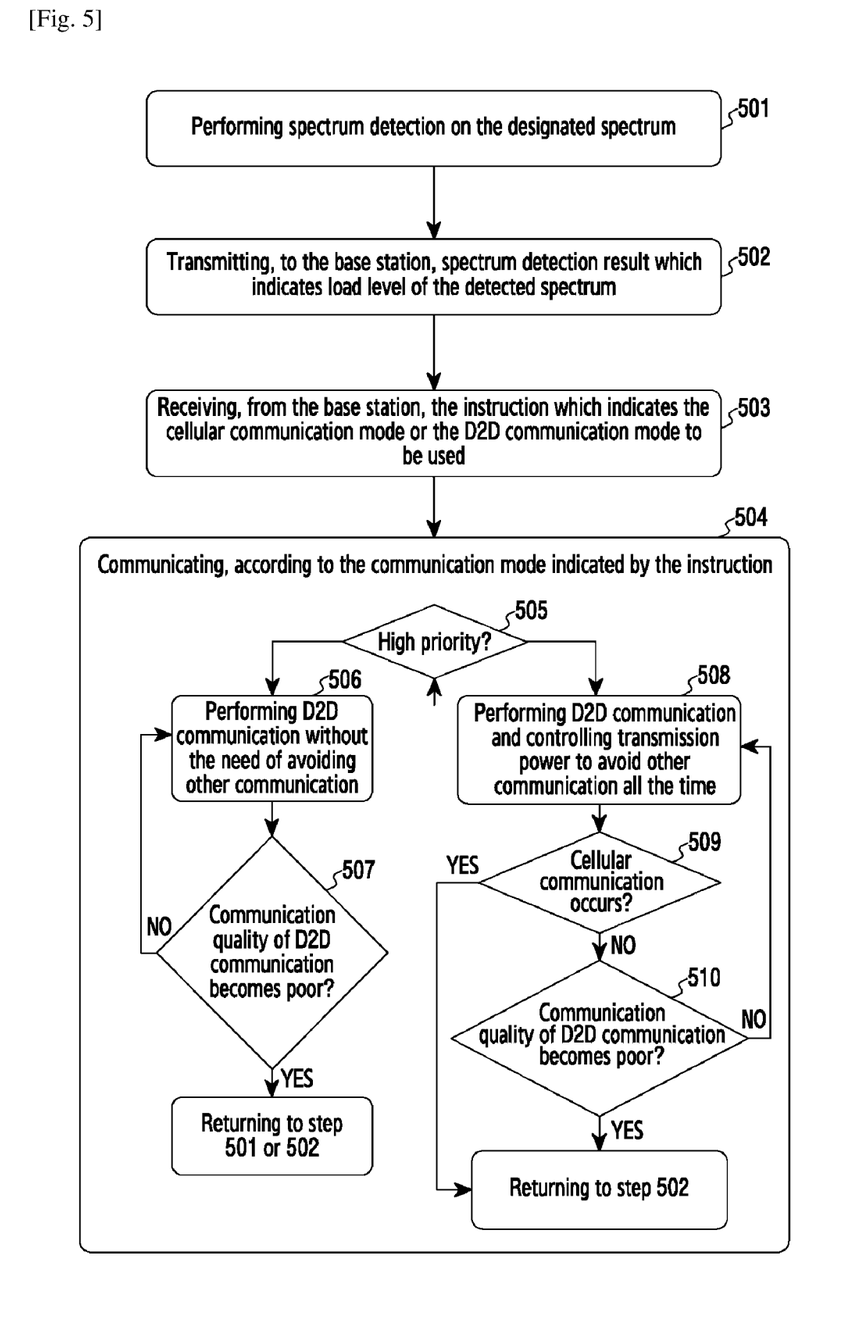
FIG. 5 illustrates an exemplary flow 500 of a method for a communication device according to an embodiment of the present application.

FIG. 5 illustrates an exemplary flow 500 of a method for a communication device according to an embodiment of the present application.

As shown in FIG. 5, in step 501, the communication device performs spectrum detection to designated spectrums. In one implementation, for example, the spectrums which needs to be detected are designated by the base station when a communication request is transmitted to the base station.

Then, in step 502, the communication device transmits to the base station the result of the spectrum detection which indicates the load level of the detected spectrum. In one implementation, the result of the spectrum detection may use at least three levels to indicate the load level of the detected spectrum. The load level may be represented by any of the following parameters: the average sensed power and the detection probability.

In step 503, the communication device receives from the base station an instruction which indicates the cellular communication mode or the D2D communication mode is to be used.

When the instruction indicates the D2D communication mode to be used, the instruction also indicates the spectrum used for the D2D communication which has an associated D2D transmission priority. The D2D transmission priority is determined based on the load level of the detected spectrum, and the spectrum with a higher load level has a lower D2D transmission priority. In one implementation, the D2D transmission priority comprises a high priority and a low priority. The high priority represents that the D2D device performs the D2D communication on this spectrum without the need of avoiding the cellular communication, and the low priority represents that the D2D device performs the D2D communication on this spectrum with the need of avoiding the cellular communication. Further, when the spectrum used for the D2D communication has the low priority, the instruction also indicates the interference threshold for the D2D communication of the pair of D2D devices on this spectrum.

Then, in step 504, the communication device communicates according to the communication mode indicated by the instruction. When the cellular communication mode is indicated, the communication device accesses the cellular network for communication according to the conventional cellular communication mode.

As shown in FIG. 5, it is further illustrated in step 504 the specific operations when the D2D communication mode is indicated.

As shown in FIG. 5, in step 505, the communication device decides whether the D2D transmission priority of the indicated spectrum is the high priority.

If the D2D transmission priority is the high priority, in step 506, the D2D communication is performed at the indicated spectrum without the need of avoiding other communication. Then, in step 507, it is detected whether the communication quality of the D2D communication becomes poor, for example lower than a predetermined quality threshold. If not, the method returns to step 506 to continue with the communication. Otherwise, the currently used spectrum is released and the method returns to step 501 or 502 (if there exists an effective result of the spectrum sending) so as to request the base station to re-allocate the spectrum resources. In one implementation, the communication device communicates and senses simultaneously. Therefore, step 501 can be omitted and the result of the spectrum sensing is directly sent to the base station.

If the D2D transmission priority is not the high priority, i.e. the D2D transmission priority of the indicated spectrum is the low priority, in step 508, the D2D communication is performed on the indicated spectrum, and the transmission power is controlled to make the generated interference lower than the interference threshold.

Further, in step 509, the D2D communication is performed while it is sensed whether there exists the cellular communication at the used spectrum. If the cellular communication exists, the spectrum cannot be used, i.e. the spectrum should be released. In some implementations, the communication device with the low priority communicates and senses the neighboring spectra simultaneously, and thus in this implementation, the method turns to step 502 so that the communication device directly transmits the result of the spectrum sensing to the base station, to request the base station to re-allocate the spectrum resources.

In addition, the communication device continuously or periodically detect whether the communication quality of the D2D communication becomes poor, for example in step 510. If the communication quality does not become poor, the method returns to step 508 to continue the D2D communication. If yes, the currently used spectrum is released and the method turns to step 502 to request the base station to re-allocate the spectrum resources.

Figure 6:
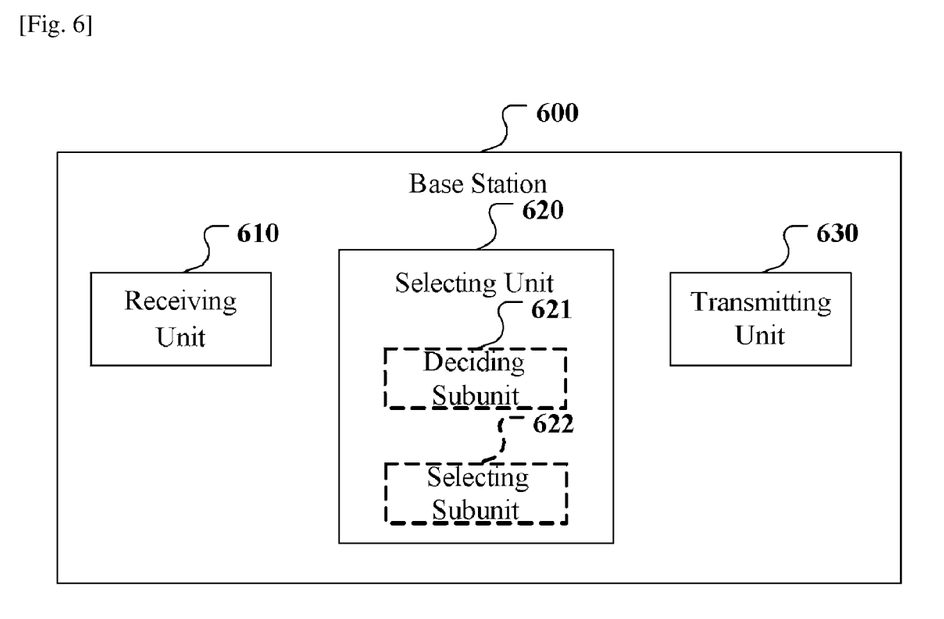
FIG. 6 illustrates a schematic block diagram of a base station of an exemplary embodiment adaptable to implement the present application.

FIG. 6 illustrates a schematic block diagram of a base station of an exemplary embodiment adaptable to implement the present application.

As shown in FIG. 6, the base station comprises a receiving unit 610, a selecting unit 620 and a transmitting unit 630.

The receiving unit 610 is configured for receiving a result of spectrum detection from the D2D device. The result of the spectrum detection indicates the load level of the detected spectrum.

The selecting unit 620 is configured for selecting the cellular communication mode or the D2D communication mode based on the result of the spectrum detection.

The transmitting unit 630 is configured for notifying the pair of D2D devices of the result of the selection.

In some embodiments, the transmitting unit 630 is also configured for assigning the spectrum used for the D2D communication in response to the selection of the D2D communication mode. The spectrum has an associated D2D transmission priority which is determined based on the load level of the detected spectrum, and the spectrum with a higher load level has a lower D2D transmission priority.

In some implementations, the D2D transmission priority comprises a high priority and a low priority. The high priority represents that the D2D device performs the D2D communication on this spectrum without the need of avoiding the cellular communication, and the low priority represents that the D2D device performs the D2D communication on this spectrum with the need of avoiding the cellular communication.

In a further embodiment, the transmitting unit 630 is also configured for: notifying the pair of D2D devices of the interference threshold for the D2D communication on this spectrum, if the spectrum used for the D2D communication has the low priority.

In some embodiments, the selecting unit 620 may comprise a deciding subunit 621 and a selecting subunit 622. The deciding subunit 621 is configured for deciding, based on the result of the spectrum detection, whether there exists a spectrum so that the communication performance of the D2D communication is better than the communication performance of the cellular communication. The selecting subunit 622 is configured for selecting the D2D communication mode and determining the spectrum used for the D2D communication based on the fact that the deciding subunit 621 decides that there exists the spectrum so that the communication performance of the D2D communication is better than the communication performance of the cellular communication, and the selecting subunit 622 is also configured for selecting the cellular communication mode based on the fact that the deciding subunit 621 decides that there does not exist the spectrum so that the communication performance of the D2D communication is better than the communication performance of the cellular communication.

In a further embodiment, the deciding subunit 621 is configured for deciding by: comparing the communication performance of the cellular communication and the optimal communication performance of the D2D communication; if the communication performance of the cellular communication is better than the optimal communication performance of the D2D communication, it is determined that there does not exist the spectrum so that the communication performance of the D2D communication is better than the communication performance of the cellular communication; otherwise, it is determined that there exists the spectrum so that the communication performance of the D2D communication is better than the communication performance of the cellular communication and the spectrum with the optimal communication performance is determined to be the spectrum used for the D2D communication. The available spectrum is a spectrum the detected load level of which is lower than a predetermined threshold.

In some implementations, the comparing is based on the received channel state information and the user information of the available spectrum from the D2D device. The channel state information may comprise channel state information of the D2D channel and the cellular channel at the available spectrum. The user information may comprise at least one of: the length of the array of data of the D2D device to be transmitted, fault tolerance, detection probability, possible transmission time and preferred spectrum.

It should be understood that individual unit and subunit comprised in the base station 600 are configured for implementing the exemplary embodiments disclosed herein. Therefore, the operations and features described with reference to FIGS. 2-4 are applicable to the base station 600 and the units/subunits therein, the detailed description thereof will not be repeated.

Figure 7:
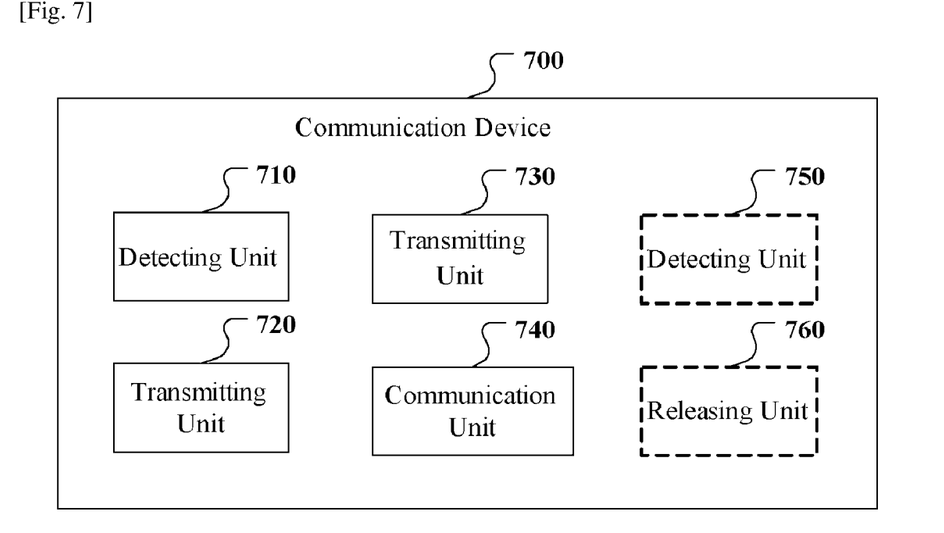
FIG. 7 illustrates a schematic block diagram of a communication device of an exemplary embodiment adaptable to implement the present application.

FIG. 7 illustrates a schematic block diagram of a communication device for implementing an exemplary embodiment of the present application.

As shown in FIG. 7, a communication device 700 comprises a detecting unit 710, a transmitting unit 720, a receiving unit 730 and a communicating unit 740.

The detecting unit 710 is configured for performing spectrum detection to a designated spectrum.

The transmitting unit 720 is configured for transmitting to the base station the result of the spectrum detection which indicates the load level of the detected spectrum. In one implementation, the result of the spectrum detection uses at least three levels to indicate the load level of the detected spectrum. The load level may be represented by any of the following parameters: an average sensed power and a detection probability.

The receiving unit 730 is configured for receiving from the base station an instruction which indicates using the cellular communication mode or the D2D communication mode. When the instruction indicates using the D2D communication mode, the instruction also indicates the spectrum used for the D2D communication which has an associated D2D transmission priority. The D2D transmission priority is determined based on the detected load level of the spectrum, and the spectrum with a higher load level has a lower D2D transmission priority.

The communicating unit 740 is configured for communicating according to the communication mode indicated by the instruction.

When the D2D communication mode is indicated and the D2D transmission priority of the indicated spectrum is the high priority, the communicating unit 740 is configured for performing the D2D communication at the indicated spectrum without the need of avoiding other communication.

When the D2D communication mode is indicated and the D2D transmission priority of the indicated spectrum is the low priority, the communicating unit 740 is configured for performing the D2D communication at the indicated spectrum, and the communicating unit 740 stops using this spectrum when the detecting unit 710 senses the cellular communication. Further, the communicating unit 740 is also configured for performing the D2D communication at the indicated spectrum and controlling the transmission power to make the interference generated by the D2D communication lower than the interference threshold indicated by the instructions.

Further, the communication device 700 may also comprise a detecting unit 750 and a releasing unit 760. The detecting unit 750 is configured for continuously or periodically detecting whether the communication quality of the D2D communication becomes lower than a predetermined quality threshold. The releasing unit 760 is configured for releasing the currently used spectrum in response to the communication quality of the D2D communication becoming lower than the predetermined quality threshold or to the end of the communication.

It should be understood that each unit and subunit comprised in the communication device 700 is configured to implement the exemplary embodiments disclosed herein. Therefore, the above operations and features described with reference to FIGS. 2 and 5 are also applicable to the communication device 700 and the units/subunits therein, the detailed description thereof will not be repeated.

The related units or modules described in the embodiments of the present application may be implemented by software or hardware. The described units or modules may also be arranged in a processor. For example it may be described as: a processor comprising a selecting unit. The names of these units or modules in certain cases do not intend to introduce any limitation to the units or modules themselves. For example the selecting unit may also be described as: "a unit for selecting a cellular communication mode or a D2D communication mode based on a result of the spectrum detection".

In another aspect, the present application provides a computer readable storage medium, which may be a computer readable storage medium contained in a base station or a communication device in the above-mentioned embodiments, or a computer readable storage medium individually exists rather than being fitted into any apparatus. There is one or more computer programs stored on the computer readable storage medium, and one or more processors run the one or more computer programs to perform the cellular network access method as described in the present application.

The above description is only the preferred embodiments of the present application and the description of the principles of applied techniques. It will be appreciated by those skilled in the art that, the scope of the claimed solutions as disclosed in the present application are not limited to those consisted of particular combinations of features described above, but should cover other solutions formed by any combination of features from the foregoing or an equivalent thereof without departing from the inventive concepts, for example, a solution formed by replacing one or more features as discussed in the above with one or more features with similar functions disclosed (but not limited to) in the present application.

The invention claimed is:

1. A method for a base station, the method comprising:
transmitting, to a pair of device-to-device (D2D) devices, spectrum information for indicating a plurality of frequency spectrums, wherein the D2D devices are unlicensed for the plurality of frequency spectrums;
receiving, from the pair of D2D devices, load information on a load level of a frequency spectrum among the plurality of frequency spectrums detected by the pair of D2D devices, wherein:
the frequency spectrum among the plurality of frequency spectrums is allocated to another licensed user device of a cellular communication, and
the load level indicates how frequently the frequency spectrum is occupied by the other licensed user device of the cellular communication;
determining a mode between a cellular mode and a D2D mode based on the frequency spectrum being occupied by the other licensed user device of the cellular communication more frequently than a predetermined threshold according to the load information; and
transmitting, to the pair of D2D devices, instruction information indicating the mode.

2. The method of claim 1, wherein:
transmitting the instruction information comprises assigning the frequency spectrum used for a D2D communication in response to the determination of the D2D mode, and
the frequency spectrum used for the D2D communication includes an associated D2D transmission priority determined based on the load level of the frequency spectrum.

3. The method of claim 1, wherein the determining the mode comprises:
determining whether the frequency spectrum exists so that a communication performance of a D2D communication is better than a communication performance of a cellular communication based on the load information; and
determining the D2D mode as the mode and determining the frequency spectrum used for the D2D communication when the frequency spectrum exists.

4. The method of claim 3, further comprising:
receiving channel state information and user information from the pair of D2D devices; and
determining, based on the channel information and user information, the communication performance of the cellular communication and the communication performance of the D2D communication on at least one available spectrum.

5. The method of claim 4, wherein:
the channel state information comprises channel state information of a D2D channel and a cellular channel on the available spectrums, and
the user information comprises at least one of a length of data of the pair of the D2D devices to be transmitted, a fault tolerance, a detection probability, a possible transmission time, or a preferred spectrum.

6. The method of claim 1, wherein the determining the mode comprises:
selecting, in accordance with a load capacity of a cellular network, the mode among the cellular mode and the D2D mode for the D2D device requesting for communication.

7. A method for a communication device, the method comprising:
receiving, from a base station, spectrum information for indicating a plurality of frequency spectrums, wherein the communication device is unlicensed for the plurality of frequency spectrums;
transmitting, to the base station, load information on a load level of a frequency spectrum among the plurality of frequency spectrums, wherein:
the frequency spectrum among the plurality of frequency spectrums is allocated to another licensed user device of a cellular communication, and
the load level indicates how frequently the frequency spectrum is occupied by the other licensed user device of the cellular communication;

receiving, from the base station, instruction information indicating a mode between a cellular mode and a device-to-device (D2D) mode based on the frequency spectrum being occupied by the other licensed user device of the cellular communication more frequently than a predetermined threshold according to the load information; and performing a communication according to the instruction information, wherein the load information is used for determining a mode among a cellular mode and the D2D mode.

8. The method of claim 7, wherein:

receiving the instruction information comprises receiving information indicating assigning the frequency spectrum used for a D2D communication in response to the determination of the D2D mode, and the frequency spectrum used for the D2D communication includes an associated D2D transmission priority determined based on the load level of the frequency spectrum.

9. The method of claim 7, further comprising:

releasing the frequency spectrum based on a communication quality of a D2D communication becoming lower than a predetermined threshold, during the D2D communication.

10. The method of claim 7, wherein the instruction information is used for performing a communication using frequency spectrum according to the mode.

11. The method of claim 10, wherein the performing the communication comprises performing a D2D communication on the indicated frequency spectrum based on a D2D transmission priority.

12. A base station comprising:

a transceiver;

at least one processor operably coupled to the transceiver and configured to:

transmit, to a pair of device-to-device (D2D) devices, spectrum information for indicating a plurality of frequency spectrums, wherein the D2D devices are unlicensed for the plurality of frequency spectrums, receive, from the pair of D2D devices, load information on a load level of a frequency spectrum among the plurality of frequency spectrums detected by the pair of D2D devices, wherein:

the frequency spectrum among the plurality of frequency spectrums is allocated to another licensed user device of a cellular communication, and the load level indicates how frequently the frequency spectrum is occupied by the other licensed user device of the cellular communication; and determine a mode between a cellular mode and a D2D mode based on the frequency spectrum being occupied by the another licensed user device of cellular communication more frequently than a predetermined threshold according to the load information, and transmit, to the pair of D2D devices, instruction information indicating the mode.

13. The base station of claim 12, wherein:

the at least one processor is further configured to assign the frequency spectrum used for a D2D communication in response to the determination of the D2D mode, and the frequency spectrum used for the D2D communication includes an associated D2D transmission priority determined based on the load level of the frequency spectrum.

14. The base station of claim 12, wherein the at least one processor is further configured to:

determine the frequency spectrum exists so that a communication performance of a D2D communication is better than a communication performance of a cellular communication based on the load information; and determine the D2D mode as the mode and determine the frequency spectrum used for the D2D communication when the frequency spectrum exists.

15. The base station of claim 14, wherein the at least one processor is further configured to:

receive channel state information and user information from the pair of D2D devices; and determine, based on the channel information and user information, the communication performance of the cellular communication and the communication performance of the D2D communication on at least one available spectrum.

16. The base station of claim 15, wherein:

the channel state information comprises channel state information of a D2D channel and a cellular channel on the available spectrums, and the user information comprises at least one of a length of data of the pair of the D2D devices to be transmitted, a fault tolerance, a detection probability, a possible transmission time, or a preferred spectrum.

17. The base station of claim 12, wherein the at least one processor is further configured to select, in accordance with a load capacity of a cellular network, the mode among the cellular mode and the D2D mode for the D2D device requesting for communication.

* * * * *